United States Patent [19]
Airheart

[11] 4,180,146
[45] Dec. 25, 1979

[54] BRAKE ASSEMBLY WITH DUAL COMPENSATION ADJUSTMENT

[75] Inventor: Franklin B. Airheart, Northridge, Calif.

[73] Assignee: Hurst Performance, Inc., Warminster, Pa.

[21] Appl. No.: 885,510

[22] Filed: Mar. 13, 1978

[51] Int. Cl.² ............................................. F16D 65/56
[52] U.S. Cl. .................................. 188/71.8; 188/71.9; 188/196 P; 188/196 BA
[58] Field of Search ................... 188/71.8, 71.9, 72.6, 188/79.5 GE, 79.5 P, 106 F, 196 BA, 196 P

[56] References Cited
U.S. PATENT DOCUMENTS

| 3,701,399 | 10/1972 | Airheart | 188/71.8 |
| 3,837,437 | 9/1974 | Martins | 188/71.8 |
| 3,942,827 | 3/1976 | Warlop et al. | 188/71.9 |
| 4,030,576 | 6/1977 | Pringle | 188/71.8 |

FOREIGN PATENT DOCUMENTS

| 1082654 | 9/1967 | United Kingdom | 188/106 F |
| 1198443 | 7/1970 | United Kingdom | 188/72.6 |

Primary Examiner—Edward R. Kazenske
Attorney, Agent, or Firm—William W. Haefliger

[57] ABSTRACT

A brake assembly comprises
(a) a carrier having a bore, and a piston slidable axially in the bore to transmit force of fluid pressure acting on the piston to a brake pad,
(b) shaft structure defining an axis and extending axially to transmit auxiliary thrust to the piston,
(c) a rotary actuator member rotatable about the axis,
(d) coupling device responsive to rotation of the member in one direction to effect axial advancement of the shaft structure toward the piston and responsive to rotation of the member in the opposite direction to allow axial retraction of the shaft structure,
(e) first wear compensation mechanism subject to adjustment to axially shift the shaft structure in response to fluid pressure produced axial displacement of the piston beyond a predetermined amount, and
(f) second wear compensation mechanism subject to adjustment to axially shift the shaft structure in response to rotation of the member beyond a predetermined amount,
(g) the first and second compensation mechanisms being operatively interconnected whereby shifting of the shaft structure by one of the compensation mechanisms serves to effect a corresponding compensating adjustment of the other of the wear compensating mechanisms.

15 Claims, 10 Drawing Figures

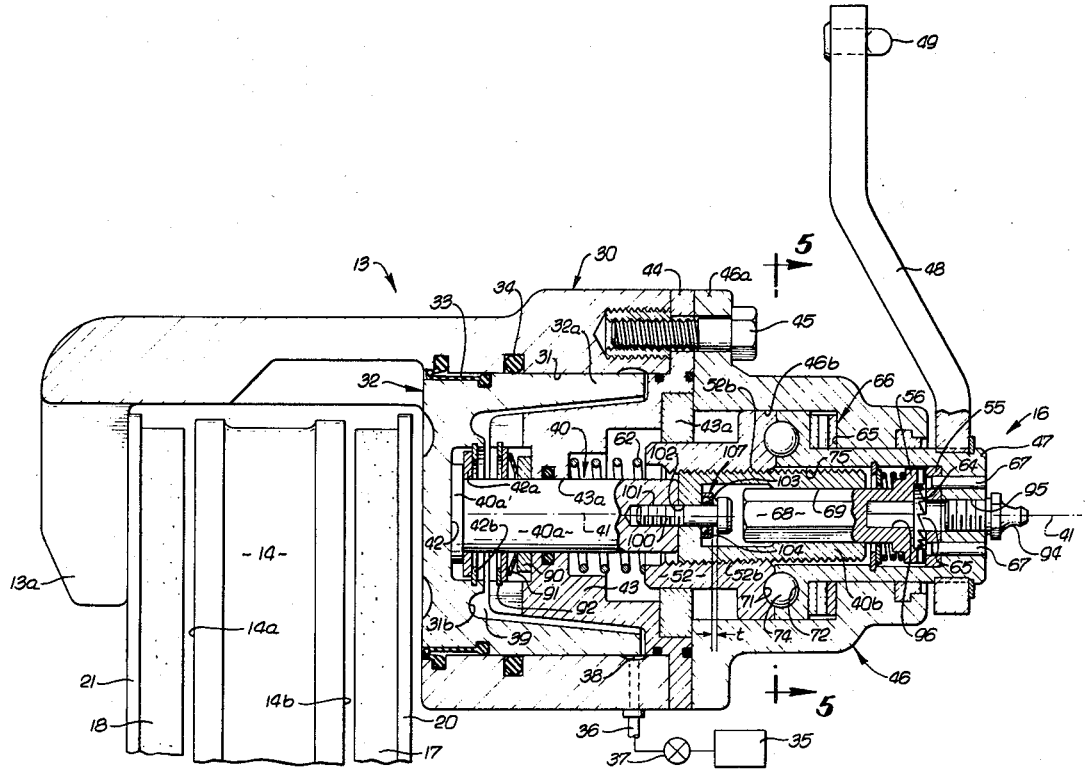

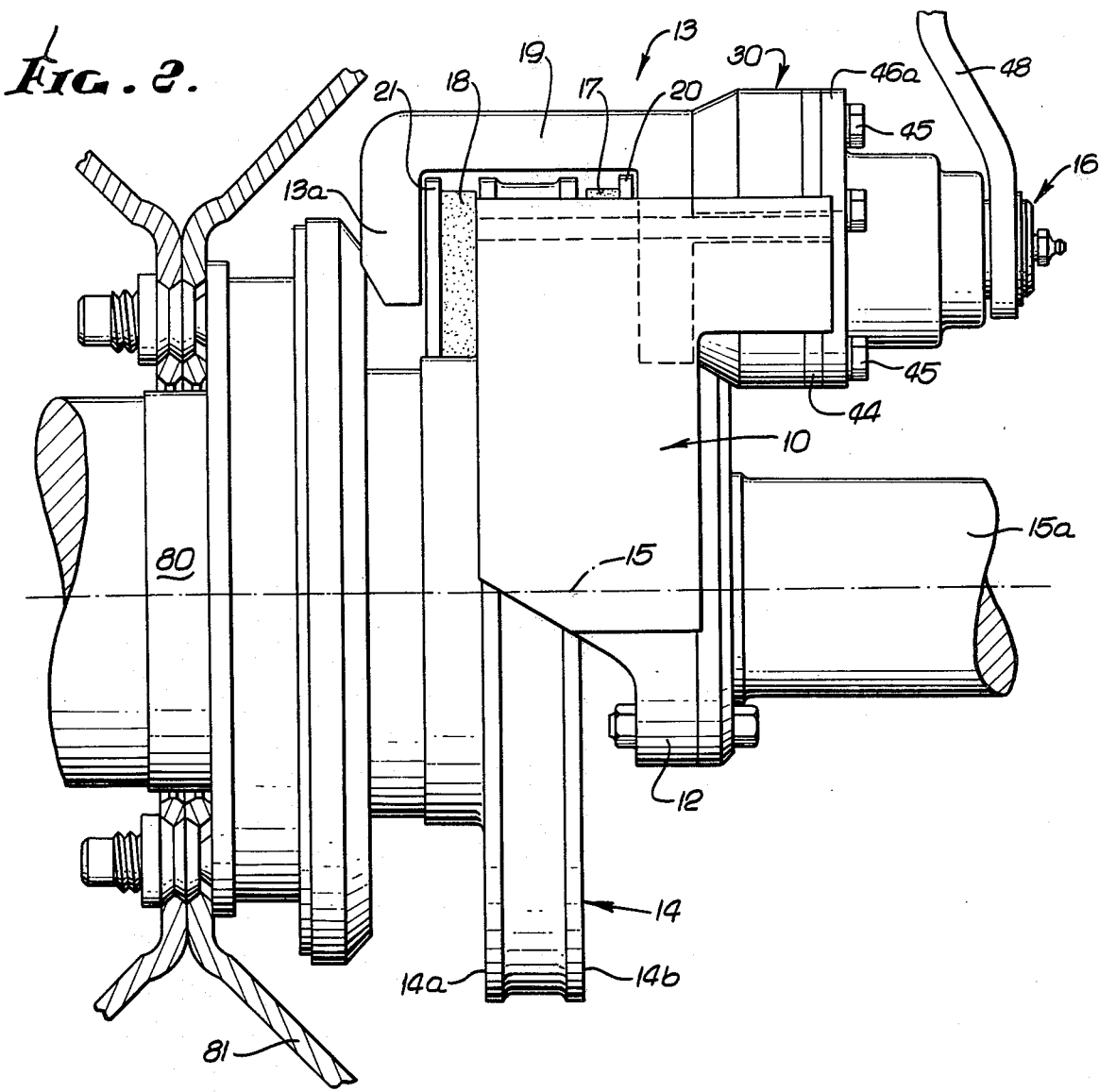
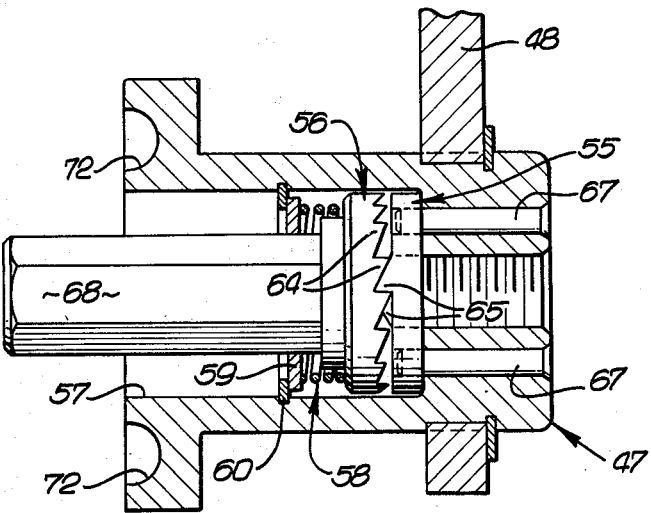

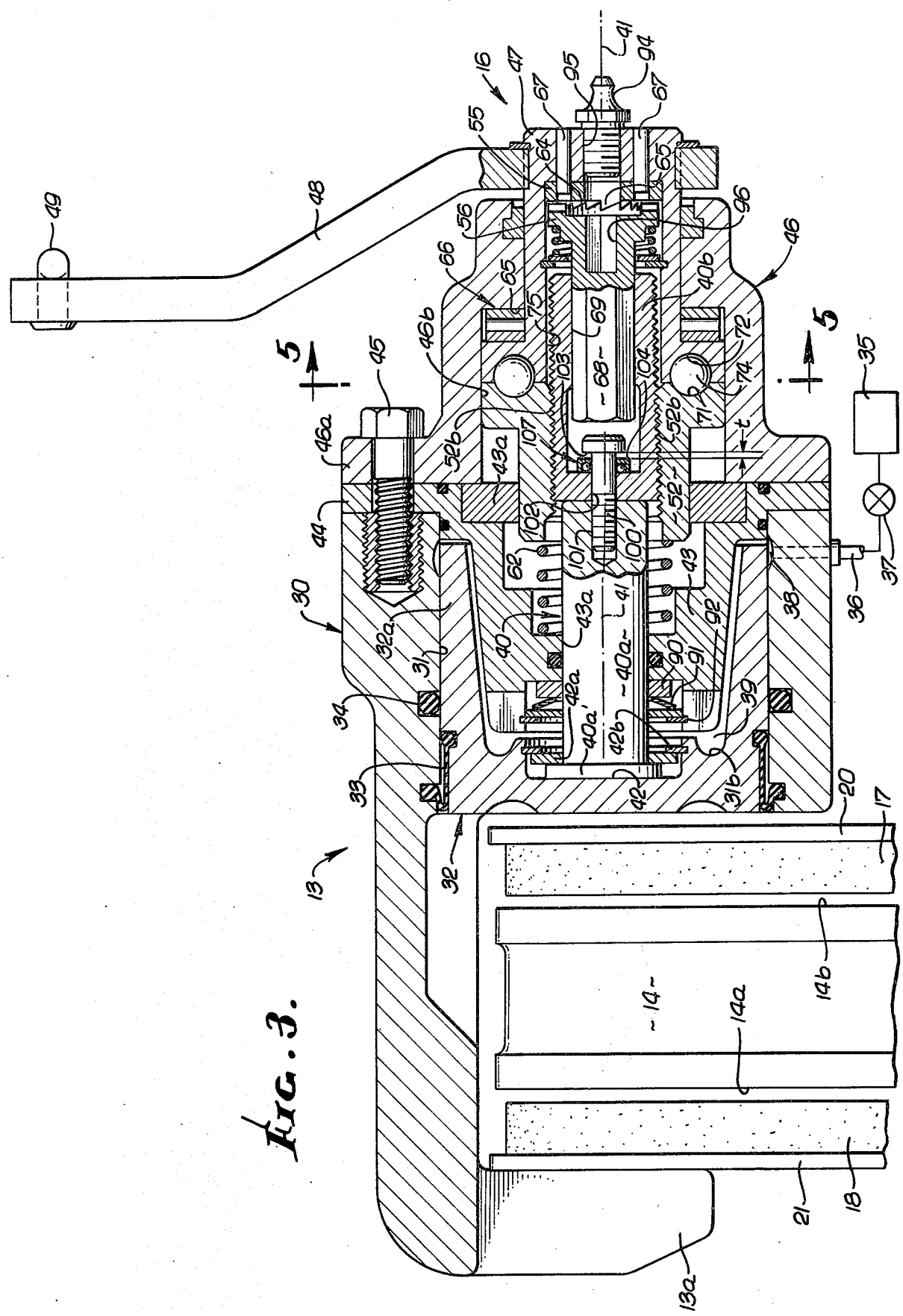

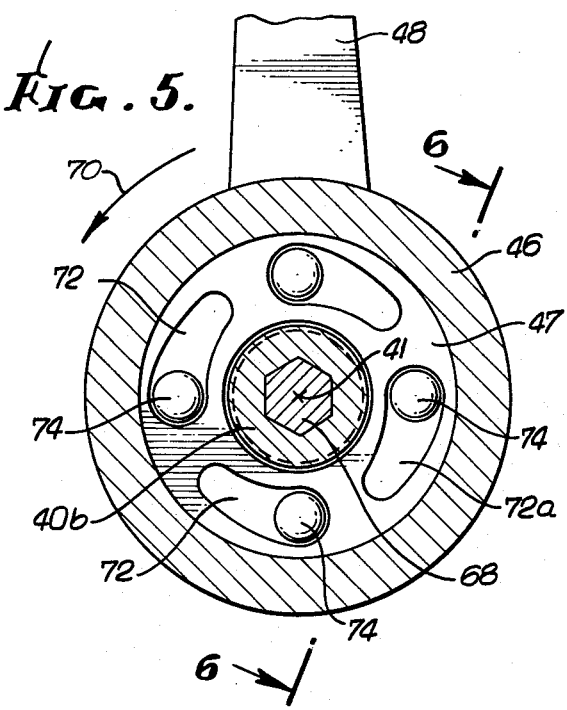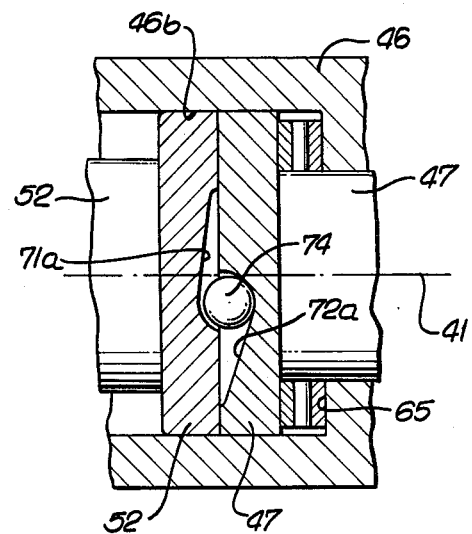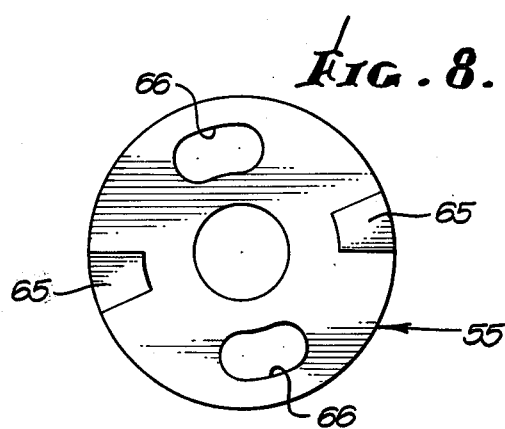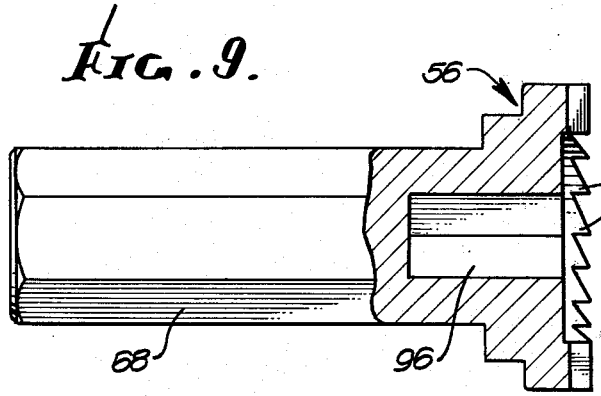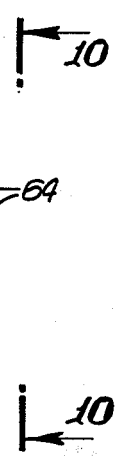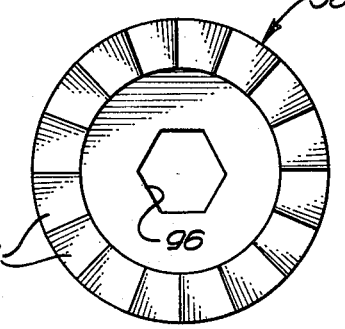

BRAKE ASSEMBLY WITH DUAL COMPENSATION ADJUSTMENT

BACKGROUND OF THE INVENTION

This invention relates generally to disc brake construction; and more particularly concerns a brake which is both mechanically and hydraulically actuable, with provision for dual mode wear compensation.

There is a continual need for improvement in brakes, including disc brakes, in the interest of increased safety especially for vehicle applications, as well as efficiency including enhanced simplicity with provision for brake pad wear compensation. Where a brake is actuable both mechanically and hydraulically, wear compensation may be provided for in both these modes; however, insofar as I am aware, no prior brake integrates wear compensation adjustment in the novel manner now made possible by the present invention, with significant improvements in structure, mode of operation and results as will be seen.

SUMMARY OF THE INVENTION

It is a major object of the invention to provide a brake assembly meeting the above referenced needs and requirements. Basically, the assembly comprises:

(a) a carrier having a bore, and a piston slidable axially in the bore to transmit force of fluid pressure acting on the piston to a brake pad, (b) shaft structure extending axially to transmit auxiliary thrust to the piston, (c) a rotary actuator member rotatable about said axis, (d) coupling means responsive to rotation of said member in one direction to effect axial advancement of the shaft structure toward the piston and responsive to rotation of said member in the opposite direction to allow axial retraction of the shaft structure, (e) first wear compensation mechanism subject to adjustment to axially shift the shaft structure in response to fluid pressure induced axial displacement of the piston beyond a predetermined amount, and (f) second wear compensation mechanism subject to adjustment to axially shift the shaft structure in response to rotation of said member beyond a predetermined amount, (g) said first and second compensation mechanisms being operatively interconnected whereby shifting of the shaft structure by one of said compensation mechanisms serves to effect a corresponding compensating adjustment of the other of said wear compensating mechanisms.

As will be seen, the first and second compensating mechanisms are typically operatively interconnected via shaft structure which includes two co-axial sections having lost motion interconnection such that shifting of the first compensating mechanism serves to effect a corresponding compensating adjustment of the second compensating mechanism; and the second mechanism typically includes two intercoupled rotary ratchet elements respectively associated with a rotary actuator member (mechanically rotatable) and with the second shaft section, a rotary lost motion connection being provided between the rotary actuator member and the primary ratchet element.

Further, and as will be seen, the coupling means may advantageously include a sleeve having threaded engagement with the shaft second section, whereby the sleeve may be displaced axially with the shaft structure to axially advance the latter endwise toward the piston; the shaft second section may also be rotatable relative to the sleeve in response to rotation of the secondary ratchet element by the primary ratchet element, thereby to axially advance the shaft second section relative to the sleeve to compensate for brake wear.

In addition, the lost motion connection between the two shaft sections may be such as to engage in response to predetermined axial displacement of one shaft section (induced by adjustment of the first wear compensating means) relatively away from the second shaft section, coupling the two sections to move axially together. Such movement then effects corresponding adjustment of the second compensating mechanisms by rotating the second shaft section with the sleeve, as well as rotating the secondary ratchet element relative to the first ratchet element, as will be seen.

These and other objects and advantages of the invention, as well as the details of an illustrative embodiment, will be more fully understood from the following description and drawings, in which:

DRAWING DESCRIPTION

FIG. 2 is a left end elevation of the FIG. 1 structure;

FIG. 3 is an enlarged section on lines 3—3 of FIG. 1;

FIG. 4 is an enlarged section showing structure in FIG. 3;

FIG. 5 is a section on lines 5—5 of FIG. 3;

FIG. 6 is a section on lines 6—6 of FIG. 5;

FIG. 7 is an enlarged end view of a ratchet element;

FIG. 8 is a frontal view on lines 8—8 of FIG. 7;

FIG. 9 is an enlarged end view of another ratchet element; and

FIG. 10 is a frontal view on lines 10—10 of FIG. 9.

DETAILED DESCRIPTION

Figure 1:
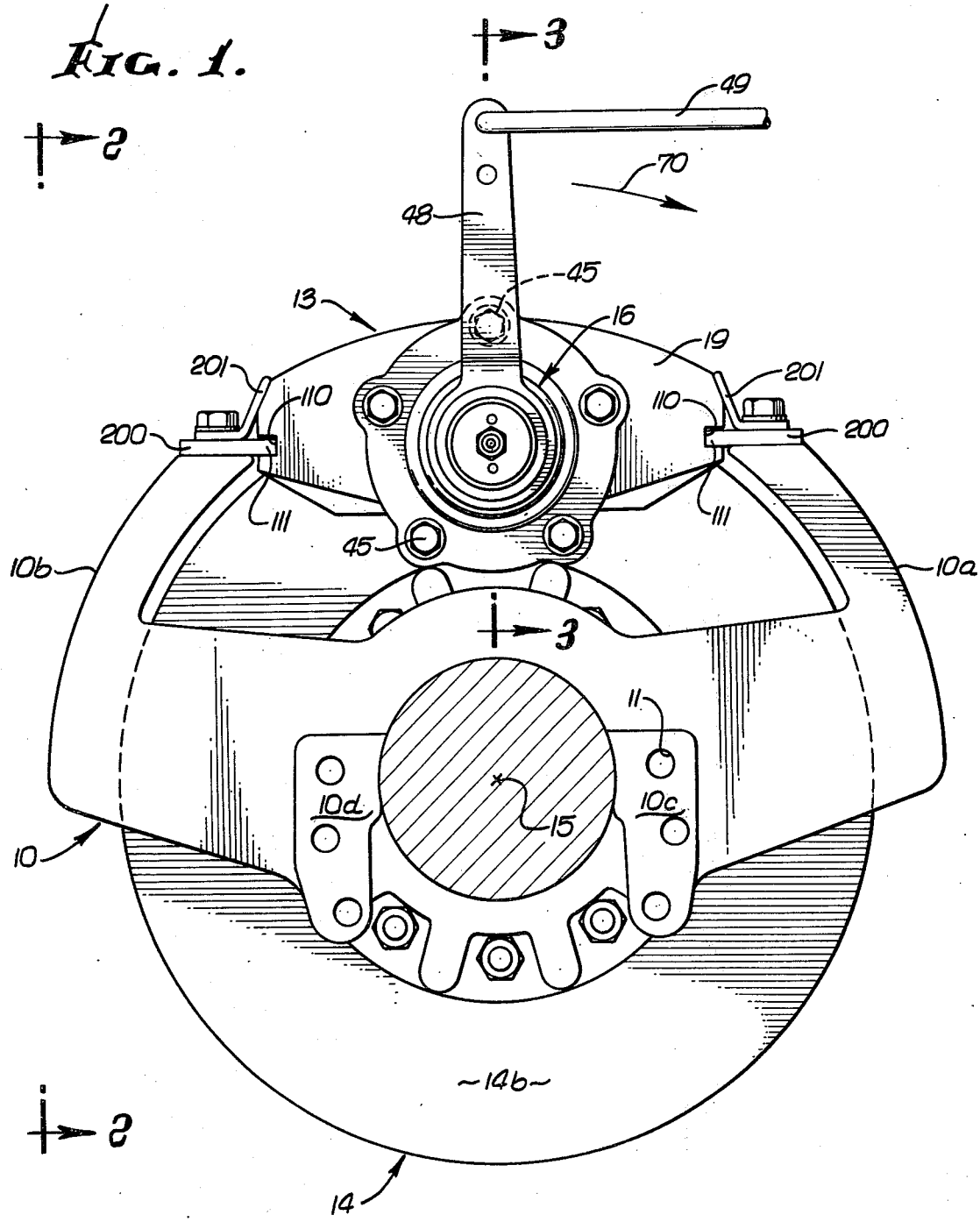
FIG. 1 is a side elevation showing disc brake structure incorporating one preferred form of the invention.

In the drawings, a torque arm 10 includes extents 10a and 10b projecting oppositely from portions 10c and 10d adapted to be bolted, via drilled openings 11, to axle flange 12. The torque arm extents 10a and 10b supporting a caliper assembly 13 straddling the disc 14, which has opposite sides or faces 14a and 14b. Disc 14 rotates about axis 15 relative to the caliper assembly, the latter carrying an actuator 16 for urging brake pad 17 against one side 14b of the disc. The caliper brake pad 18 is carried at the opposite side of the disc to engage and brake that side 14a in response to operation of the actuator, and reaction shifting of the caliper body 19 parallel to axis 15 of axle 15a. Guideways 100 on body 19 receive tongues 111 on plates 200 which are bolted to torque arm extents 10a and 10b, to accommodate such shifting. Flat springs 201, also bolted to plates 200, engage angled surfaces of body 19 to prevent rattle.

The pads 17 and 18 are respectively carried by plates 20 and 21 suitably carried for axial shifting in response to braking and caliper reaction shifting.

Extending the description to FIG. 3, the brake assembly embodied in the actuator 16 includes a carrier; which may comprise a housing 30 integral with the caliper 13. The carrier has a bore 31, and a piston 32 is movable axially in the bore to transmit force of fluid pressure acting on the piston to the brake pad 17, as via plate 20, for example. Piston skirt 32a is slidable in bore 31, and an annular dust seal 33 is provided between the piston and the bore; also an O-ring seal is provided at 34. Pressurized hydraulic fluid from a source 35 is conducted at 36, via valve 37, to plenum chamber 38, from which pressure is delivered to the piston chamber 39 for exertion on piston face 31b to advance the piston leftwardly.

The assembly also includes shaft structure 40 extending coaxially with the piston, their common axis being shown at 41. Such structure includes first and second coaxial shaft sections 40a and 40b. Connector rings 42a and 42b attach the shaft end flange 40a' to the piston at 42, and a guide bore 43a in annular mount 43 guides the shaft section 40a for leftward and rightward displacement. In this regard, and as will be seen, the shaft structure functions to transmit auxiliary thrust to the piston, as during mechanical or auxiliary braking (for example during parking). Mount 43 is integrally attached to the carrier; for example a machine screw 45 may clamp a flange 44 on the mount between the right end of the housing 30, and a flange 46a on a cap 46. The elements 30, 43 and 46 may be considered as embodied in the carrier, which is integral with the caliper 13. Note caliper arm 13a at the side of the disc 14 opposite from the piston. In FIG. 2, disc 14 may be integral with structure 80 to which a vehicle wheel 81 is suitably attached.

Further in accordance with the invention, a rotary actuator member is rotatable about axis 41, and coupling means is provided to be responsive to rotation of the actuator member in one direction to effect axial advancement of the shaft structure toward the piston, and responsive to rotation of the actuator member in the opposite direction to allow axial retraction of the shaft structure.

In the illustrated embodiment, the actuating member may comprise, for example, rotor 47 turnable about axis 41 by arm 48 projecting exteriorly of the cap 46. Mechanical braking force may be transmitted to the arm, as by cable 49 shown in FIG. 1, and a return spring (not shown) may be attached to the arm to return it to non-actuated position, i.e. in which no auxiliary braking force is to be transmitted to the piston 32.

The coupling means may with unusual advantage include a sleeve 52 having helically threaded engagement at 52b with shaft second section 40b, whereby the sleeve may be displaced axially with the shaft structure to axially displace the latter endwise toward the piston. A key interengages the mount 43 and the sleeve 52 to block rotation of the latter while allowing axial shifting of the sleeve. The sleeve also slidably engages the cap bore 46b, as shown. The key appears at 43a.

The coupling means advantageously includes ramp means, and pusher bearing means engageable with the ramp means to effect axial displacement of the sleeve 52 toward the piston in response to rotation of the actuator member 47 in one rotary direction, i.e. the direction of arrow 70 in FIG. 1. As illustrated, the ramp means may advantageously include first ramp means 71 on a flanged portion of sleeve 52, and second ramp means 72 on a flanged portion of member 47 axially spaced from sleeve 52, the pusher bearing means comprising bearing balls 74. Member 47 is principally confined by cap 46, in FIG. 3, and defines a central opening or bore 75 in alignment with the shaft second section 40b. As further shown in FIGS. 5 and 6, the first ramp means includes multiple ramps 71a circularly spaced about axis 41, and tapering radially and axially, as well as circularly, in one direction about that axis. The second ramp means includes multiple ramps 72a, similar to ramps 71a, circularly spaced about axis 41, and also tapering radially and axially, as well as circularly, but in the opposite direction about that axis. As a result, when the actuator member is rotated, the ramps 72a are rotated relative to ramps 71a, and the balls ride up both ramps, to displace sleeve 52 axially leftwardly. Spring 62 acts to urge the elements 52, 47 and 74 into closely axially stacked or assembled relation, as shown in FIG. 3. A thrust bearing 66 between the flanged portion of member 47 and wall 65 of cap 46 accommodates rotation of member 47.

FIG. 3 also shows the provision of a grip ring 90 on the first shaft section 40a and having interference fit with same. A Belleville spring 91 bears against the ring to resist leftward advancement of the ring and shaft, for retracting same when the brake is released. Keeper ring 92 attached to mount 43 blocks displacement of the Belleville spring, and blocks the ring 90 when the shaft is sufficiently displaced, so that the shaft may adjustably shift automatically to compensate for brake wear. Elements 90–92 may be considered as includible within the scope of the heretofore referenced first wear compensating mechanism, which functions to axially shift the shaft structure in response to fluid pressure induced axial displacement of the piston beyond a predetermined amount.

Also provided, in accordance with the invention, is second compensation mechanism subject to displacement to axially shift the shaft structure in response to rotation of the actuator member beyond a predetermined amount. As appear in FIGS. 4–10, the second compensation mechanism may advantageously include intercoupled primary and secondary rotary ratchet elements as at 55 and 56, respectively associated with the rotary actuator member and with the second section. As shown, the elements 55 and 56 and the right end portion of a part 68 are received within bore 57 of member 47, and retained therein, in coupled relation, by compression spring 58, washer 59 and retaining ring 60. The spring bears against flanged element 56 on part 68, yieldably urging it rightwardly.

Element 56 defines annularly spaced ratchet teeth 64 which face rightwardly. Element 55 has two ratchet teeth 65 facing leftwardly to mesh with teeth 64. Element 55 also has circularly elongated through openings 66 which receive the ends of pins 67 carried by member 47, as is clear from FIG. 4. A rotary lost motion connection is thereby provided between member 47 and the primary ratchet element 55. The operation is such that as lever 48 and member 47 are rotated beyond a predetermined amount, as for example sufficiently to cause the pins 67 to travel circularly in the slots 66 and then to reach the ends of the slots so as then to rotate element 55, the latter will slip its ratchet teeth over the ratchet teeth 64 on element 56. Upon return rotation of ratchet element 55 together with handle 48, element 55 will rotate element 56 and part 68, rotating shaft section 40b and advancing it to the left in FIG. 3 and relative to sleeve 52, the thread 52a accommodating same. If sufficient return rotation takes place, teeth 65 will slip over the rightwardmost crest edges of teeth 64 (pushing ratchet 56 and part 68 correspondingly to the left), and thereafter ratchet 56 will snap to the right (due to compression exerted by spring 58) and the two ratchets will fully mesh.

Part 68 may have external flats (i.e. hex flats) to have sliding telescopic interfit with the bore 69 shaft second section 40b whereby the part 68 is rotatably coupled to shaft second section 40b to rotate therewith. Compensation for brake wear is thereby provided by "second means" in addition to that provided by the "first means" discussed above.

Note that grease plug 94 may be removed from a bore 95 in member 47, to allow insertion of a tool such as an internal wrench with hex cross section. The latter may be fitted into a bore 96 (also provided with hex cross section) in part 68, to couple thereto. Rotation of the wrench then rotates part 68 and shaft section 40b relative to sleeve 52, to provide auxiliary adjustment for wear compensation. Such adjustment facilitates rightward retraction of items 68 and 40b when a replacement brake pad 17 is to be provided. An opening 61 in element 55 passes the wrench.

It is an additional and important feature of the invention to provide operative interconnection between the first and second compensation mechanisms described above, whereby shifting of the shaft structure by one of these mechanisms serves to effect a corresponding compensation adjustment of the other of the wear compensation mechanisms. This function is typically facilitated by the separation of the shaft structure into two shaft sections 40a and 40b, as described above, and also by axial lost motion interconnection of the two sections. In this regard, it will be noted that adjustment for wear compensation by the first compensation means will occur only after leftward travel of shaft section 40a to fully compress Belleville spring 91, and only thereafter will shaft section 40a be adjustably dragged to the left relative to grip ring 90.

The lost motion connection between the shaft sections 40a and 40b is typically constructed to cause leftward movement of shaft section 40b only when shaft section 40a is adjustably dragged to the left, as described, shaft 40b simultaneously rotating relative to sleeve 52 as facilitated by the high angularity of threading at 52b. Part 68 is simultaneously rotated with shaft section 40b, and so ratchet element 56 is also rotated in adjustment relation to element 55 (which is not then rotated by crank 48).

As shown in FIG. 3, the lost motion connection may advantageously include a retainer, such as a fastener 100, connected at 101 to one shaft section (section 40a for example) and telescopically coupled to the other shaft section. Note the fastener shank projecting through bore 102. Axially spaced shoulders are provided on the retainer and on the other shaft section, as at 103 and 104, and adapted to interengage in response to predetermined axial displacement "t" of the one shaft section relatively endwise away from the other section. Upon such interengagement, the two sections move together, i.e., one section 40a moves left with the other section 40b. Thread 52b allows rotation of section 40b along with part 68 and ratchet element 56, as described, to achieve rotary relative adjustment of ratchet elements 55 and 56, the second compensating means described above, upon simultaneous adjustment of the first compensating means. Note bearing ball and retainer parts 107 that provide shoulder 104, and which allow low friction coupling between non-rotary fastener 100 and rotary shaft section 40b.

I claim:
1. In a brake assembly, the combination comprising
    (a) a carrier having a bore, and a piston slidable axially in the bore to transmit force of fluid pressure acting on the piston to a brake pad,
    (b) shaft structure defining an axis and extending axially to transmit auxiliary thrust to the piston, said structure including first and second shaft sections having a first lost motion interconnection,
    (c) a rotary actuator member rotatable about said axis,
    (d) coupling means responsive to rotation of said member in one direction to effect axial advancement of the shaft structure toward the piston and responsive to rotation of said member in the opposite direction to allow axial retraction of the shaft structure,
    (e) first wear compensation mechanism subject to adjustment to axially shift the shaft structure in response to fluid pressure produced axial displacement of the piston beyond a predetermined amount, and
    (f) second wear compensation mechanism subject to rotary adjustment to axially shift the shaft structure in response to rotation of said member beyond a predetermined amount,
    (g) said first and second compensation mechanisms being operatively interconnected via the shaft sections whereby shifting of the shaft structure by one of said compensation mechanisms serves to effect a corresponding compensating adjustment of the other of said wear compensating mechanisms,
    (h) the first shaft section being coupled to the first compensating mechanism, and the second shaft section coupled to the second compensating mechanism, the second compensating mechanism including interengageable elements respectively associated with the second shaft section and said rotary actuator member to provide unidirectional rotary coupling which is releasable in response to rotation of said member in said opposite direction, there being a second lost motion connection between the rotary actuator and one of said elements, and
    (i) said coupling means including a sleeve having threaded engagement with the shaft second section, whereby the sleeve may be displaced axially with the shaft structure to axially advance the shaft structure endwise toward the piston, the shaft second section also being rotatable relative to the sleeve in response to said rotary adjustment of the second wear compensation mechanism, thereby to axially advance the shaft second section relative to said sleeve, to compensate for brake wear.

2. The combination of claim 1 wherein said first lost motion interconnection is an axial lost motion connection.

3. The combination of claim 1 wherein the interengageable elements comprise rotary ratchet elements respectively associated with the rotary actuator member and with the second shaft section, said second lost motion connection being a rotary lost motion connection.

4. The combination of claim 3 including a part mounting one rotary ratchet element and having sliding telescopic interfit with the shaft second section, said part rotatably coupled to the shaft second section to rotate therewith.

5. The combination of claim 4 wherein said part has a connection to which access may be had for adjustably rotating said part and shaft second section relative to the sleeve.

6. The combination of claim 5 wherein the first compensating mechanism includes a grip ring on the shaft structure and having interference fit therewith, and a Belleville spring urging the ring and shaft in an axial direction relatively away from the piston, there being a shoulder engaged by the Belleville spring and adapted to block displacement of the ring in a direction away from the piston, to allow the shaft structure to be shifted axially relative to the ring.

7. In a brake assembly, the combination comprising
  (a) a carrier having a bore and a piston slidable axially in the bore to transmit force of fluid pressure acting on the piston to a brake pad,
  (b) shaft structure defining an axis and extending axially to transmit auxiliary thrust to the piston, said structure including first and second shaft sections having axial lost motion interconnection,
  (c) a rotary actuator member rotatable about said axis,
  (d) coupling means responsive to rotation of said member in one direction to effect axial advancement of the shaft structure toward the piston and responsive to rotation of said member in the opposite direction to allow axial retraction of the shaft structure,
  (e) first wear compensation mechanism subject to adjustment to axially shift the shaft structure in response to fluid pressure producing axial displacement of the piston beyond a predetermined amount, and
  (f) second wear compensation mechanism subject to adjustment to axially shift the shaft structure in response to rotation of said member beyond a predetermined amount,
  (g) said first and second compensation mechanisms being operatively interconnected via the shaft sections whereby shifting of the shaft structure by one of said compensation mechanisms serves to effect a corresponding compensating adjustment of the other of said wear compensating mechanism,
  (h) the first shaft section being coupled to the first compensating mechanism, and the second shaft section coupled to the second compensating mechanism, the second compensating mechanism including intercoupled primary and secondary rotary ratchet elements respectively associated with the rotary actuator member and with the second shaft section, there being a rotary lost motion connection between the rotary actuator member and the primary rotary ratchet element, and
  (i) said coupling means including a sleeve having threaded engagement with the shaft second section, whereby the sleeve may be displaced axially with the shaft structure to axially advance the shaft structure endwise toward the piston, the shaft second section also being rotatable relative to the sleeve in response to rotation of the second ratchet element by the primary ratchet element, thereby to axially advance the shaft second section relative to said sleeve, to compensate for brake wear.

8. The combination of claim 7 wherein said coupling means includes ramp means, and pusher bearing means engageable with the ramp means to effect said axial displacement of the sleeve in response to rotation of said rotary actuator member in one direction about a rotary axis.

9. The combination of claim 8 wherein said ramp means is on the rotary actuator member, and on the sleeve.

10. The combination of claim 8 wherein said ramp means includes first ramp means on the rotary actuator member, and second ramp means on the sleeve.

11. The combination of claim 10 wherein said first ramp means includes multiple ramps circularly spaced about the said axis and tapering radially and axially in one direction about said axis, and said second ramp means includes multiple ramps circularly spaced about said axis and tapering radially and axially in the opposite direction about said axis.

12. The combination of claim 11 wherein the carrier includes a housing about the piston and shaft structure.

13. The combination of claim 12 including a caliper arm integral with the carrier to project at the side of a rotary braking disc and brake pad means engageable with the disc side opposite from the piston.

14. The combination of claim 13 including support structure for the carrier, and defining guideways to accommodate bodily shifting of the carrier and caliper arm in directions generally parallel to the axis of the shaft.

15. The combination of claim 7 wherein said lost motion connection includes a retainer connected to one shaft section and telescopically coupled to the other shaft section, there being axially spaced shoulders on the retainer and the other shaft section adapted to interengage in response to predetermined axial displacement of the one shaft section relatively away from the other shaft section coupling the two shaft sections upon said interengagement so that the two shaft sections then move axially together.

* * * * *